United States Patent
Baird (10) Patent No.: US 8,866,350 B2
(45) Date of Patent: Oct. 21, 2014

(54) ELECTRO-MAGNETIC ENGINE WITH PIVOTING PISTON HEAD

(75) Inventor: Jeffery D. Baird, Ada, OK (US)

(73) Assignee: Magtricity, LLC, Ada, OK (US)

( * ) Notice: Subject to any disclaimer, the term of this patent is extended or adjusted under 35 U.S.C. 154(b) by 366 days.

(21) Appl. No.: 13/116,713

(22) Filed: May 26, 2011

(65) Prior Publication Data

US 2012/0299399 A1  Nov. 29, 2012

Related U.S. Application Data (63) Continuation of application No. PCT/US2009/065908, filed on Nov. 25, 2009.

(60) Provisional application No. 61/118,295, filed on Nov. 26, 2008, provisional application No. 61/232,109, filed on Nov. 7, 2009.

(51) Int. Cl.
*H02K 7/06* (2006.01)
*H02K 7/065* (2006.01)
*H02K 33/00* (2006.01)

(52) U.S. Cl.
CPC ..................................... *H02K 33/00* (2013.01)
USPC .................................. 310/20; 310/46; 310/37

(58) Field of Classification Search
CPC ............. H01F 7/17; H02K 7/065; H02K 7/06
USPC ........................ 310/14, 15, 23, 20, 37, 30, 46
See application file for complete search history.

(56) References Cited

U.S. PATENT DOCUMENTS

| | | | |
|---|---|---|---|
| 1,886,040 A * | 11/1932 | Moodyman | 310/24 |
| 2,056,719 A | 10/1936 | Gelnaw | |
| 2,296,554 A * | 9/1942 | Hinchman | 310/20 |
| 3,832,608 A * | 8/1974 | Mills | 318/37 |
| 3,949,249 A | 4/1976 | Wiseley et al. | |
| 4,012,675 A | 3/1977 | Schulze, Jr. | |
| 4,019,103 A | 4/1977 | Davis et al. | |
| 4,151,431 A | 4/1979 | Johnson | |
| 4,317,058 A | 2/1982 | Blalock | |
| 4,345,174 A | 8/1982 | Angus | |
| 4,510,420 A | 4/1985 | Sasso | |

(Continued)

FOREIGN PATENT DOCUMENTS

EP   1793483   6/2007

OTHER PUBLICATIONS

International Search Report and Written Opinion (PCT/US2009/065908); Jun. 29, 2010.

(Continued)

*Primary Examiner* — Terrance Kenerly
(74) *Attorney, Agent, or Firm* — Dunlap Codding, P.C.

(57) ABSTRACT

An electromagnetic engine including a plurality of pistons and a plurality of corresponding electromagnets. The pistons are each connected to a crankshaft and fabricated of a ferrous material. The electromagnets are spaced from the pistons in alignment therewith. An electrical power source is provided to power the electromagnets, and a control assembly is provided to control the sequence of energizing the electromagnets, so that by energizing the electromagnets, the pistons will be pulled toward the electromagnets in response to a timely applied electromagnetic field. The force imparted on the piston is transmitted by the rod to the crankshaft, which provides power via an output shaft for desired uses.

8 Claims, 7 Drawing Sheets

(56) References Cited

U.S. PATENT DOCUMENTS

| | | | |
|---|---|---|---|
| 4,684,834 A | 8/1987 | Hartman, Sr. | |
| 4,749,893 A | 6/1988 | Reynolds | |
| 5,219,034 A * | 6/1993 | Wortham | 180/65.31 |
| 5,276,372 A * | 1/1994 | Hammer | 310/24 |
| 5,469,004 A * | 11/1995 | Jachim | 310/24 |
| 5,637,936 A | 6/1997 | Meador | |
| 7,105,958 B1 | 9/2006 | Elmaleh | |
| 7,382,106 B2 | 6/2008 | Kundel | |
| 7,579,722 B1 * | 8/2009 | Borchert | 310/24 |
| 2005/0211199 A1 | 9/2005 | Liang et al. | |
| 2005/0211200 A1 | 9/2005 | Liang et al. | |
| 2006/0118072 A1 | 6/2006 | Meintschel et al. | |
| 2008/0265687 A1 * | 10/2008 | Chang | 310/12 |

OTHER PUBLICATIONS

International Preliminary Report on Patentability (PCT/US2009/065908); Jun. 9, 2011.

* cited by examiner

ELECTRO-MAGNETIC ENGINE WITH PIVOTING PISTON HEAD

CROSS-REFERENCE TO RELATED APPLICATIONS

This application is a continuation of International Application No. PCT/US09/65908, filed Nov. 25, 2009, which claims the benefit of U.S. Provisional Application Ser. No. 61/118,295, filed Nov. 26, 2008, and U.S. Provisional Application Ser. No. 61/232,109, filed Aug. 7, 2009, the contents of each being incorporated herein by reference.

BACKGROUND OF THE INVENTION

1. Field of the Invention

This invention relates generally to a reciprocating electromagnetic engine, and more particularly, but not by way of limitation, to a magnetically driven engine for developing shaft power.

2. Brief Description of Related Art

The creation of magnetic energy by electricity is well known in the art. One of the most prevalent uses of such energy is electric motors. The direct use of such energy, however, is somewhat limited in industry to those applications where, for example, the magnetic attraction forces are used to lift objects or to separate magnetic particles from compounds containing both magnetic and nonmagnetic particles. A more prevalent direct use of magnetic energy is found wherever electrical solenoids are used. Such usage comprises making and breaking electrical contacts, opening and closing valves, and hot-melt glue guns or other such applications where a predetermined amount of a product is dispensed upon demand or at specific time intervals. More recently, the field created by magnetic energy has been used in particle acceleration devices such as cyclotrons and synchrotrons.

The fascination associated with the potential uses of magnetic energy has led to a number of devices other than the above, whereby electrical energy is converted into magnetic energy which is then converted into mechanical rotational motion. These devices are generally known as electromagnetic engines. They differ from the common electric motor in that they contain one or more pistons attached to a crankshaft which provides the mechanical output. In light of the number of attempts to produce an electromagnetic engine, there is an obvious need to effectively increase the power output and the efficiency of electromagnetic engines before they can, in fact, be considered to be competitive with other engines and motors such as electric motors and internal combustion engines. Moreover, based on the noncommercial use of such engines, the need for an electromagnetic engine having a high efficiency coupled with a high power output still exists today. It is to such an apparatus that the present invention is directed.

SUMMARY OF THE INVENTION

The present invention is directed to an electro-mechanical engine for automotive or other use. An electromagnetic engine is provided with a plurality of pistons and a plurality of corresponding electromagnets. The pistons are each connected to a crankshaft and fabricated of a ferrous material. The electromagnets are spaced from the pistons in alignment therewith. An electrical power source is provided to power the electromagnets, and a control assembly is provided to control the sequence of energizing the electromagnets, so that by energizing the electromagnets, the pistons will be pulled toward the electromagnets in response to a timely applied electromagnetic field. The force imparted on the piston is transmitted by the rod to the crankshaft, which provides power via an output shaft for desired uses.

BRIEF DESCRIPTION OF THE DRAWINGS

FIGS. 5A-5F are elevational views of the switch showing a sequence of operation.

DETAILED DESCRIPTION OF EXEMPLARY EMBODIMENTS

Figure 1:
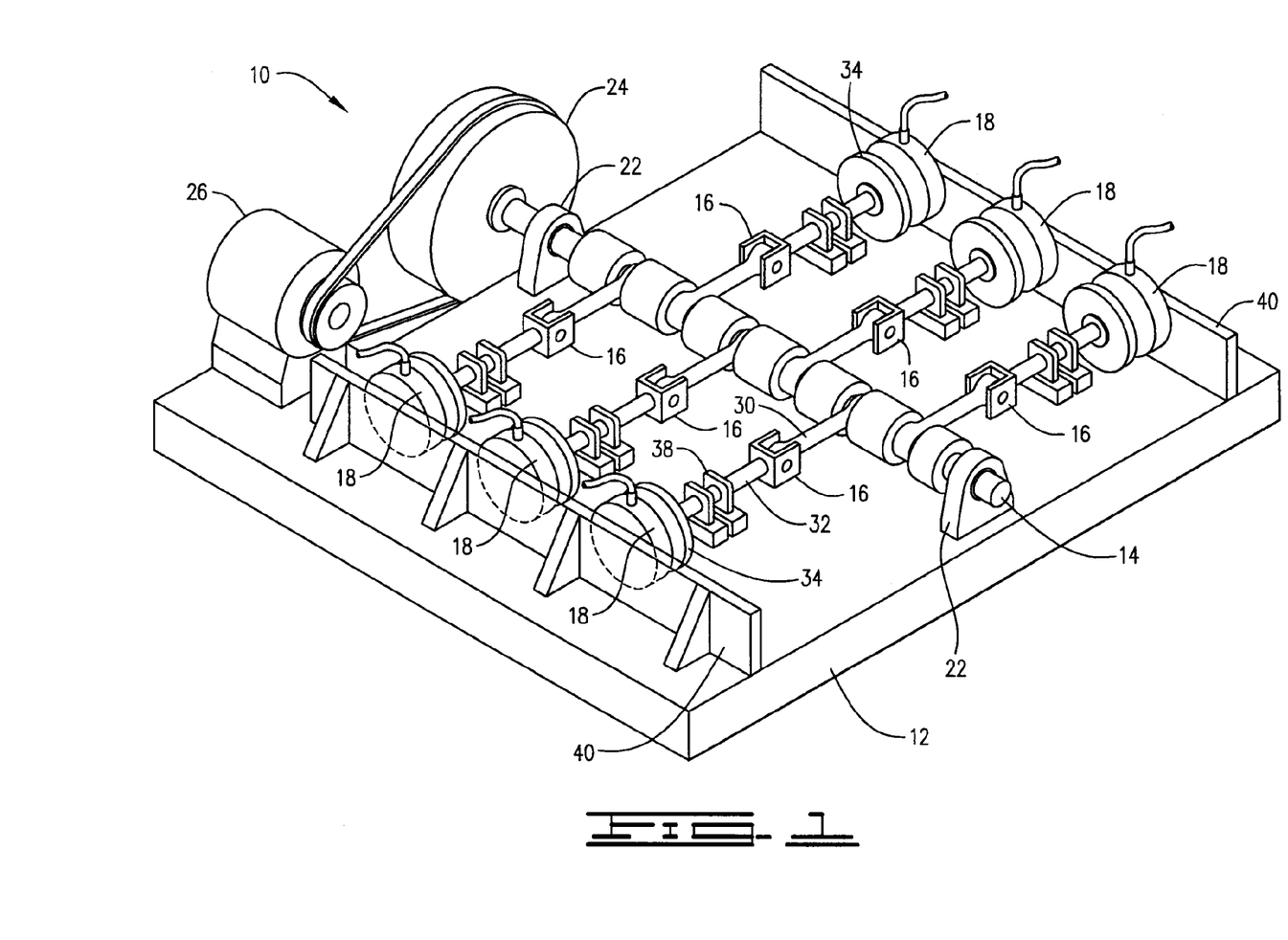
FIG. 1 is a perspective view of an electromagnetic engine constructed in accordance with the present invention.
Figure 2:
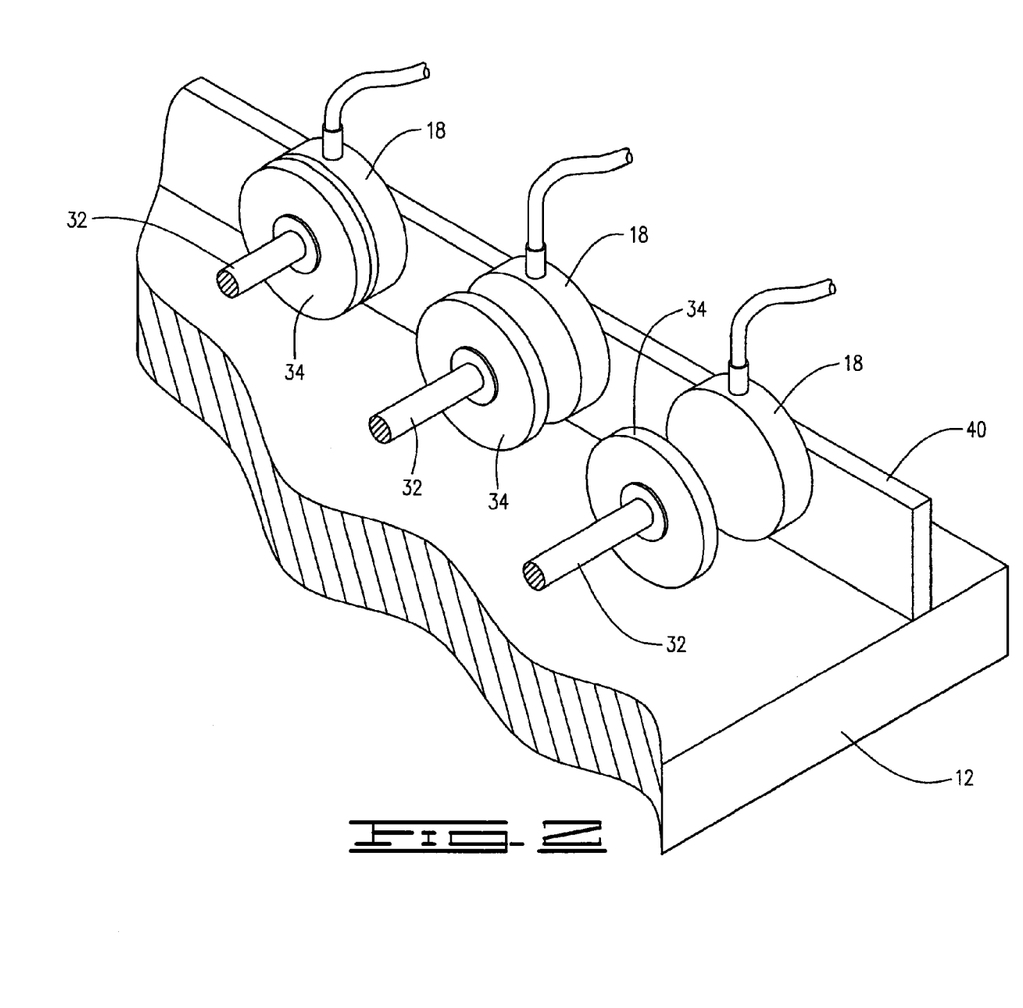
FIG. 2 is a perspective view of a portion of the electromagnetic engine of the present invention.
Figure 3:
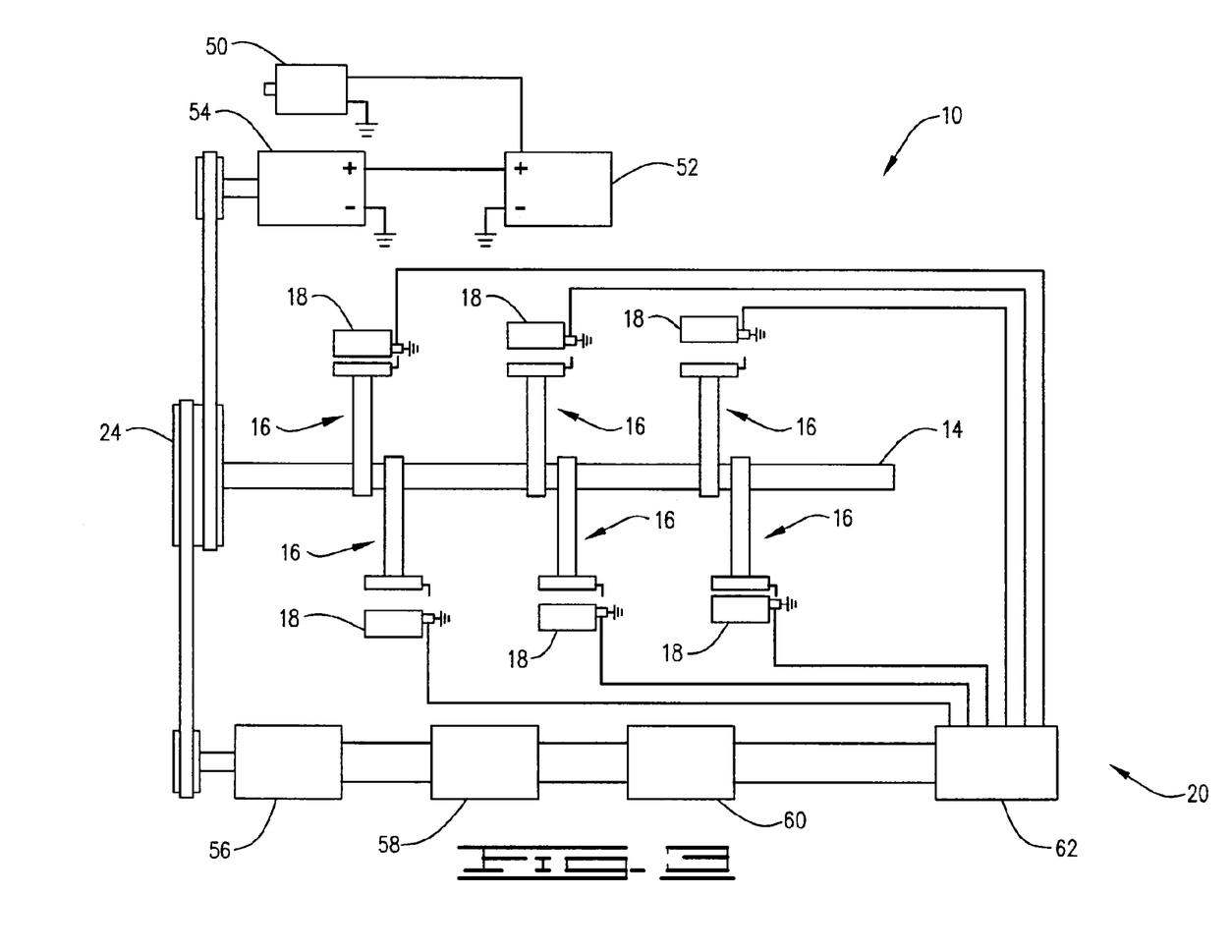
FIG. 3 is a schematic view of a power distribution system.
Figure 3D:
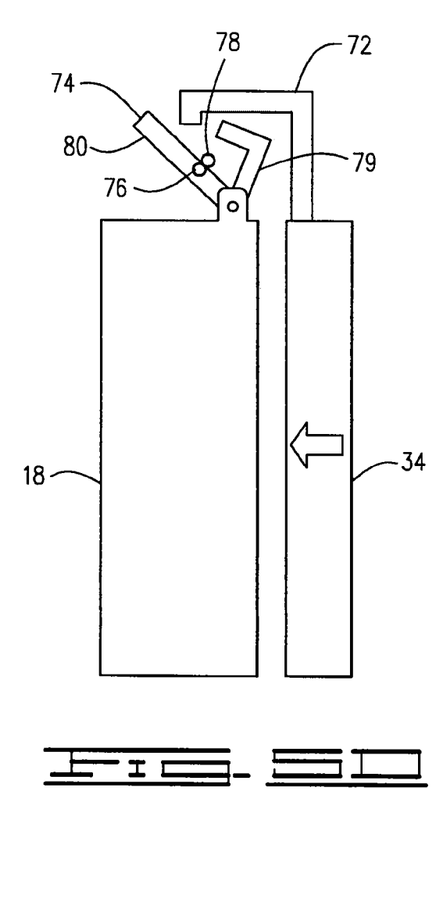
Figure 3E:
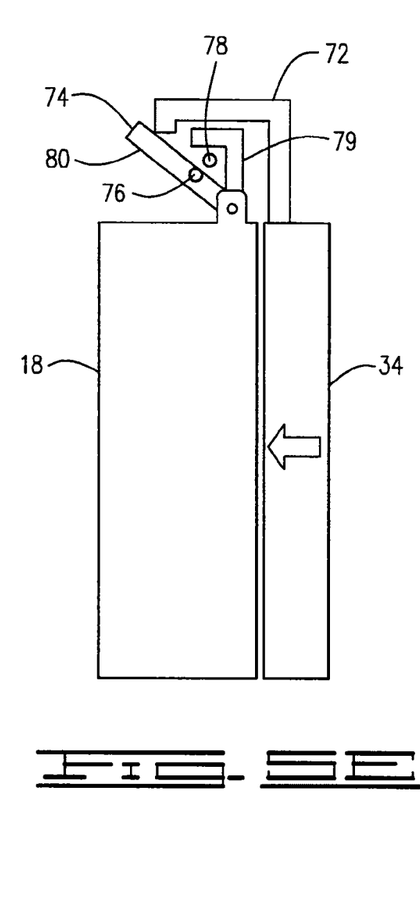
Figure 3F:
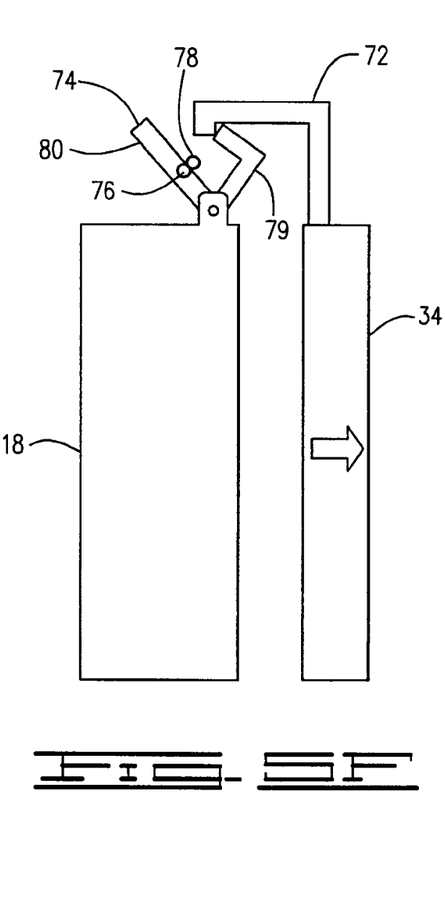

Referring to FIGS. 1-3, an electromagnetic engine 10 constructed in accordance with the present invention is shown. Broadly, the electromagnetic engine 10 includes a support structure 12, such as a frame or housing, a crankshaft 14 journaled to the support structure 12, at least one piston assembly 16 operably connected to the crankshaft 14, at least one electric magnet 18 for imparting reciprocating mechanical energy to the piston assembly 16 which in turn is translated into rotational motion of the crankshaft 14, and a power distribution system 20 (FIG. 3) for selectively energizing and de-energizing the electric magnet 18.

The support structure 12 may be manufactured of any non-magnetically interfering composition, such as a non-ferrous material like a high strength plastic, ceramic, or aluminum. The support structure 12 may be in the form of a frame or base, as illustrated, so as to provide an open faced platform to reduce friction and heat related issues. However, the support structure may take the form of any functional structure, such as a more traditional engine block.

The crankshaft 14 is rotatably connected to the support structure 12 with a plurality of bearings 22. One end of the crankshaft 14 is provided with a pulley 24 for translating the rotational motion imparted to the crankshaft 14 to a load source, such as a generator 26. Although not shown, the pulley 24 may be provided with counterbalance weights for storing and releasing energy. The crankshaft 14 is shown to be a conventional six-cylinder crankshaft; however, it will be appreciated that a variety of crankshaft designs may be utilized.

The engine 10 is shown to include a plurality of piston assemblies 16. Each of the piston assemblies 16 has a piston arm 30, a piston rod 32, and a piston head 34. One end of the piston arm 30 is journaled to the crankshaft 14 in a conventional manner and the other end of the piston arm 30 is pivotally connected to the piston rod 32. The piston rod 32 is reciprocally supported on the support structure 12 by a piston rod housing or sleeve 38. The piston head 34 is connected to the distal end of the piston rod 32 and manufactured of a ferrous material, such as iron or steel.

The electric magnets 18 are mounted to the support structure 12 so that the electric magnets 18 are axially aligned with a corresponding piston head 34 and maintained in a spaced apart relationship with respect to such piston head 34 so that the magnetic fields created by the electric magnets 18 provide an attractive force which tends to pull the piston assembly 16 toward the electric magnet 18. The electric magnets 18 are shown to be mounted to the support structure 12 with a magnet mount 40 in a flat arrangement to provide for a low profile engine. However, it will be appreciated that other mounting arrangements such as V-shaped, inline, or radial are also possible, as well as any other arrangement that is capable of imparting rotational motion to the crankshaft 14.

The operation of the engine 10 is described by reference to the stroke of a piston assembly 16. In one embodiment, the electric magnet 18 is energized so as to create an attractive force which pulls the piston assembly 16 toward the electric magnet 18. As the piston head 34 reaches the top of its stroke, the electric magnet 18 is de-energized. To take advantage of the full attractive force of the electric magnet 18, the electric magnet 18 is preferably positioned so that the electric magnet 18 is near the piston head 34 when the piston assembly 16 is at the top of its stroke (sometimes referred to as "top dead center"). By way of example, with a piston assembly that has a three inch stroke, the electric magnet may be spaced from the piston head a distance of about 1/16 of an inch when the piston assembly is at the top of its stroke. Such a distance is small enough for the piston head to receive the full attractive force of the electric magnet, yet great enough to avoid the electric magnet interfering with the reciprocating movement of the piston assembly.

At some point after the piston assembly 16 begins its return stroke, the electric magnet 18 must be energized again by the power distribution system 20 to repeat the stroke cycle. While the "firing" sequence for the energizing and de-energizing of the electric magnets are critical to the operation of prior art electromagnetic engines, the engine 10 attempts to avoid the problems encountered when attempting to precisely time the energizing and de-energizing.

Referring now to FIG. 3, the power distribution system 20 is broadly illustrated as including a starter switch 50, a low voltage power source 52, such as a 12 or 24 volt battery, and a starter motor 54 operatively connected to the crankshaft 14 for actuating the engine 10. The power distribution system 20 further includes a generator 56 operably connected to the crankshaft 14. The generator 56 may be used to power an AC power bank 58. The generator 56 is also connected to an AC/DC converter 60 which is connected to a manifold 62. The manifold 62 is electrically connected to each of the electric magnets 18.

The precise timing of the actuation of the electromagnets has been the subject of prior art references. In an attempt to avoid such issues, the electric magnets 18 preferably remain energized throughout the stroke with the exception of when the pistons are near or at top dead center and for a distance during the return stroke.

Figure 4A:
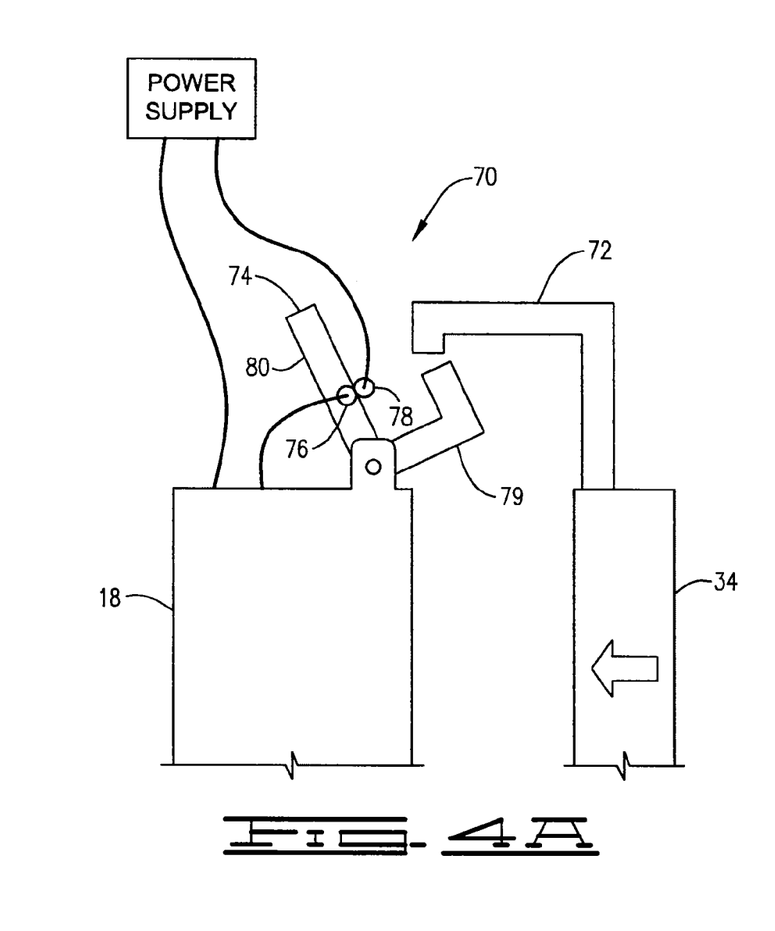
FIGS. 4A and 4B are elevational views of a switch associated with a piston head and a corresponding electric magnet.
Figure 4B:
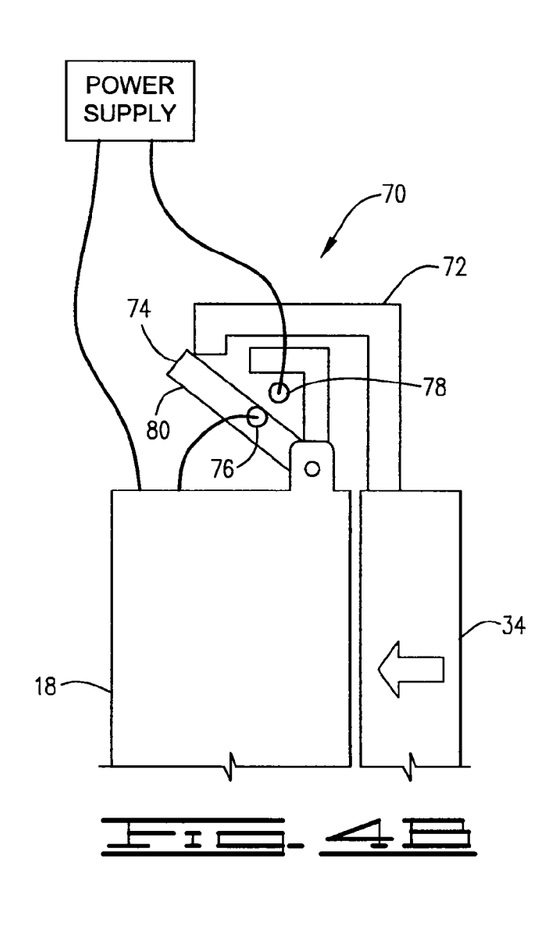
Figure 5A:
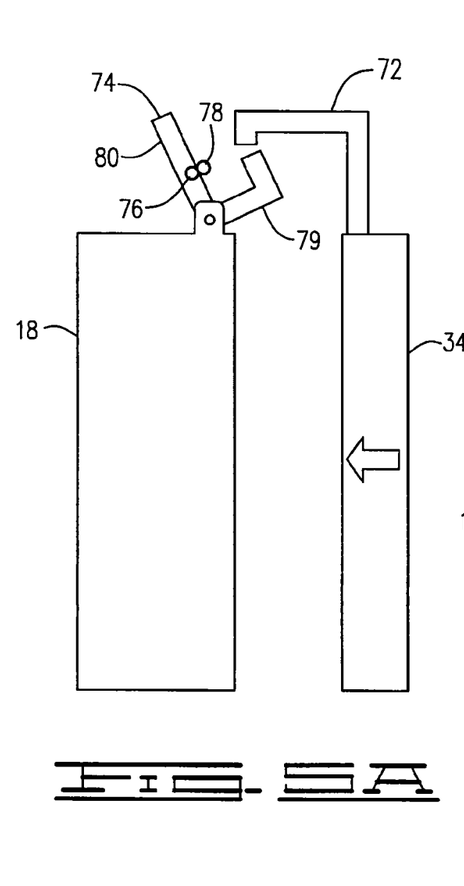
Figure 5B:
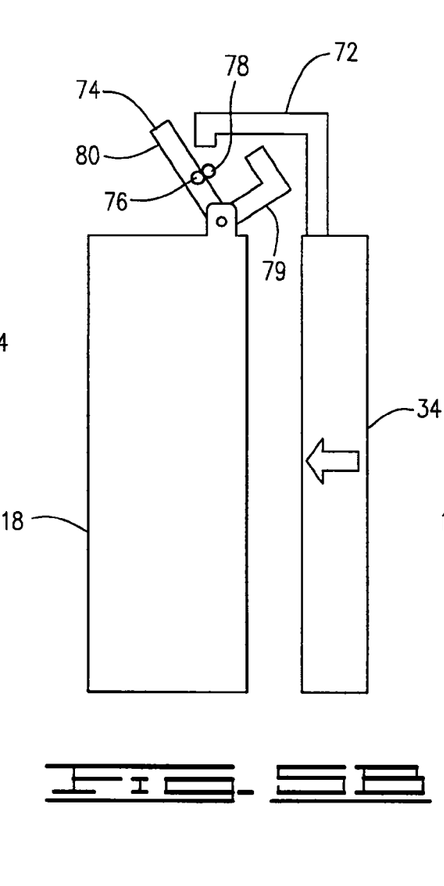
Figure 5C:
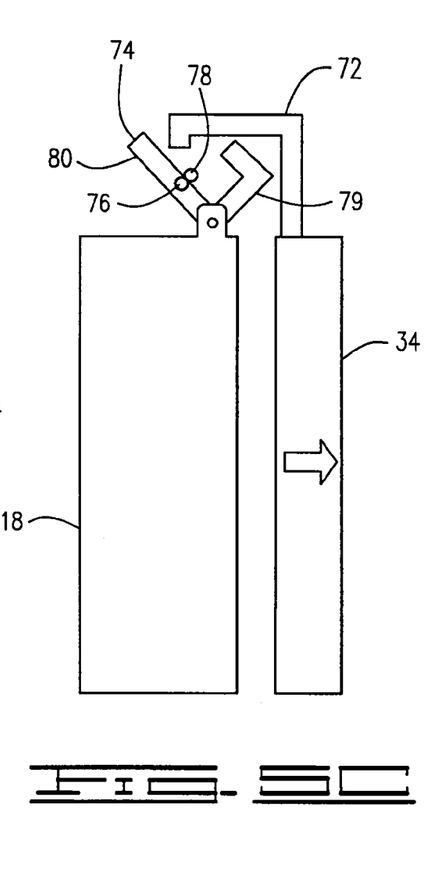

Referring now to FIGS. 4 and 5, the power distribution system 20 is shown to further include a switch 70 associated with each piston head and electric magnet combination. The switch includes a piston push arm 72 extending from the piston head 34 and a V-switch 74 provided with a contact plate 76 and pivotally connected to the electric magnet 18, and a hot contact member 78. As best shown in FIGS. 4A and 5B, the contact plate 76 is electrically connected to the electric magnet 18, while the hot contact member 78 is electrically connected to a power source or manifold.

As demonstrated in FIGS. 5A-5F, with the contact plate 76 in electrical communication with the hot contact member 78, the electric magnet 18 is energized. As such, the piston head 34 is pulled toward the electric magnet 18. As the piston head 34 is pulled toward the electric magnet 18, the piston push arm 72 will bypass a first leg 79 of the V-switch 74 and contact a second leg 80. As the piston head 34 continues toward the electric magnet 18, the V-switch 74 will be rotated thereby causing the contact plate 76 of the second leg 80 to disengage from the hot contact member 78 and in turn de-energize the electric magnet 18. As the piston head 34 begins the return stroke (FIG. 5F), the piston push arm 72 will travel a distance and then catch the first leg 79 of the V-switch 74 so as to cause the V-switch 74 to rotate and cause the contact plate of the second leg 80 to electrically contact the hot contact member 78 and re-energize the electric magnet 18.

It should be appreciated that the power distribution system 20 may be any suitable system for energizing and de-energizing the electric magnets 18 in a predetermined sequence. For example, a suitable power distribution system 20 may include a cam provided on the crankshaft 14 that actuates a series of switches (e.g., proximity switches) in a desired sequence. It should also be appreciated that the number of piston assemblies that may be employed in the engine 10 may be varied. In addition, the moving parts may be lubricated in any conventional manner, such as a drip oil system or a pressure oil system.

Figure 6:
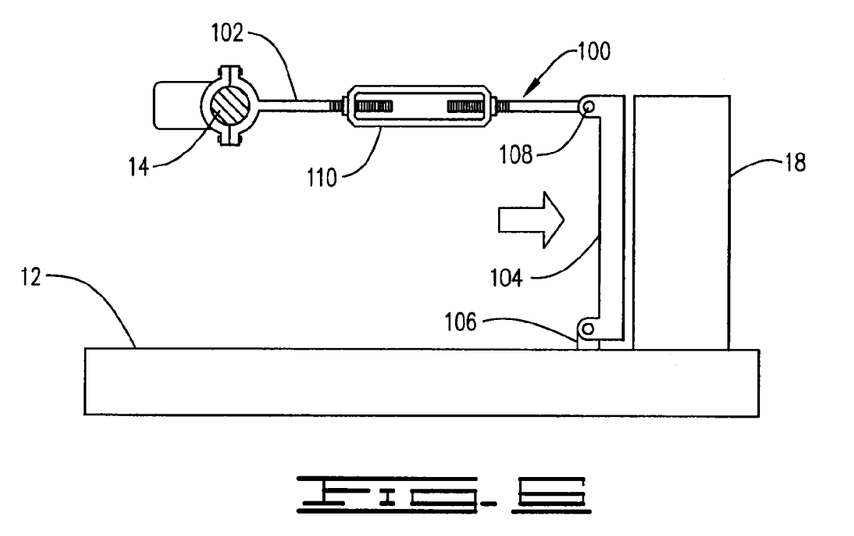
FIG. 6 is a side elevational view of another embodiment of a piston assembly shown at the top of its stroke.
Figure 7:
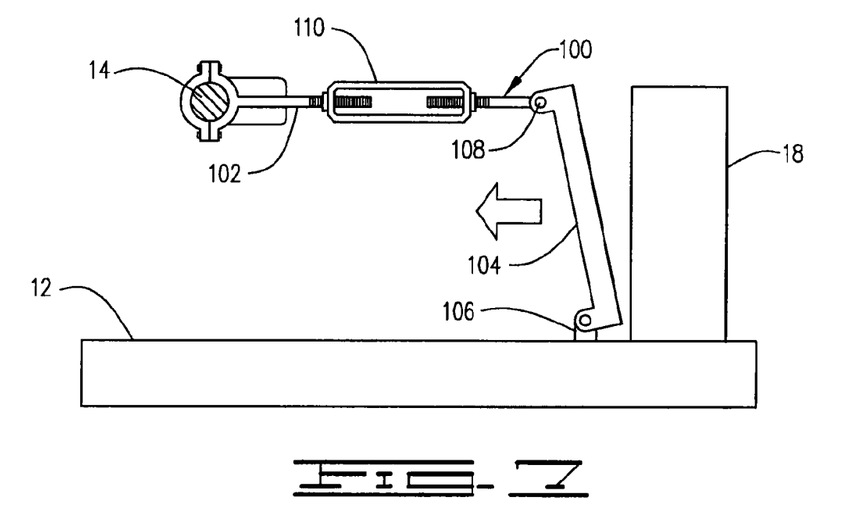
FIG. 7 is a side elevational view of the piston assembly of FIG. 6 shown at the bottom of its stroke.

FIGS. 6-7 illustrate another embodiment of a piston assembly 100. The piston assembly 100 includes a piston rod 102 and a piston head 104. The piston head 104 is supported on the support structure 12 such that the piston head 104 travels along an angular path between the top of its stroke or at a top dead center (FIG. 6) and the bottom of its stroke (FIG. 7). In the embodiment shown herein, a lower end of the piston head 104 is pivotally connected to the support structure 12 with a hinge 106, or any other suitable pivot connector, so that the piston head 104 is in a face-to-face relationship with the electric magnet 18 when the piston head 104 is at the top of its stroke (FIG. 6) and angularly disposed relative to the electric magnet 18 otherwise, with the maximum angular displacement taking place at the bottom of the stroke. In addition, the piston head 104 preferably is positioned near the electric magnet 18 when the piston head 104 is at the top of its stroke in a manner similar to that described above in reference to the piston assembly 16.

The piston rod 102 has one end journaled to the crankshaft 14 in a conventional manner. The other end of the piston rod 102 is pivotally connected to the piston head 104 with a hinge 108, or any other suitable pivot connector, so that the piston rod 102 transmits a rotational force to the crankshaft 14 in response to the angular movement of the piston head 104. To maximize stroke length, the piston rod 102 is pivotally connected to the piston head 104 at a location diametrically opposed to where the piston head 104 is pivotally connected to the support structure 12. However, it should be appreciated that the piston rod 102 may be attached to the piston head 104 at any location to achieve a desired stroke length.

The piston rod 102 may be constructed such that its length is adjustable. To this end, the piston rod 102 may be provided with a turnbuckle assembly 110 (FIGS. 6 and 7) or any other suitable adjustment mechanism. In addition, because the piston rod 102 is pivotally connected to the piston head 104, the piston rod 102 is not required to be reciprocally supported on the support structure 12.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. An engine, comprising:
a support structure;
at least one electric magnet connected to the support structure;
a crankshaft rotatably connected to the support structure;
at least one piston assembly having one end operably connected to the crankshaft and a second end positioned in a spaced apart relationship to the electric magnet such that a magnetic field created by the electric magnet provides an attractive force which pulls the piston assembly toward the electric magnet so as to impart reciprocating mechanical energy to the piston assembly; and
means for selectively energizing and de-energizing the electric magnet,
wherein the piston assembly comprises:
a piston rod having a first end and a second end, the first end journaled to the crankshaft; and
a piston head fabricated of a ferrous material, the piston head pivotally connected to the second end of the piston rod to define a first pivot point and pivotally connected to the support structure to define a second pivot point such that the piston head travels between a first position and a second position along an angular path about the second pivot point.

2. The engine of claim 1, wherein the support structure is a platform having an open upper face, and wherein the crankshaft is connected to the open upper face of the platform.

3. The engine of claim 1, wherein in the first position the piston head is in a face-to-face relationship with the electric magnet and wherein in the second position the piston head is angularly disposed relative to the electric magnet.

4. The engine of claim 3, wherein the piston rod is pivotally connected to the piston head at a location diametrically opposed to where the piston head is pivotally connected to the support structure.

5. An engine, comprising:
a support structure;
a plurality of electric magnets connected to the support structure;
a crankshaft rotatably connected to the support structure;
a plurality of piston assemblies, each piston assembly having one end operably connected to the crankshaft and a second end positioned in a spaced apart relationship to a corresponding one of the electric magnets such that magnetic fields created by the electric magnets provide an attractive force which pulls the piston assembly toward the corresponding electric magnet so as to impart reciprocating mechanical energy to the piston assemblies; and
means for selectively energizing and de-energizing the electric magnets,
wherein each of the piston assemblies comprises:
a piston rod having a first end and a second end, the first end journaled to the crankshaft; and
a piston head fabricated of a ferrous material, the piston head pivotally connected to the second end of the piston rod to define a first pivot point and pivotally connected to the support structure to define a second pivot point such that the piston head travels between a first position and a second position along an angular path about the second pivot point.

6. The engine of claim 5, wherein the support structure is a platform having an open upper face, and wherein the crankshaft is connected to the open upper face of the platform.

7. The engine of claim 5, wherein in the first position the piston head is in a face-to-face relationship with the electric magnet and wherein in the second position the piston head is angularly disposed relative to the electric magnet.

8. The engine of claim 7, wherein the piston rod is pivotally connected to the piston head at a location diametrically opposed to where the piston head is pivotally connected to the support structure.

* * * * *